Oct. 20, 1953 H. L. JACKSON 2,656,534
TUNE-UP SYSTEM FOR RADAR
Filed Jan. 14, 1950
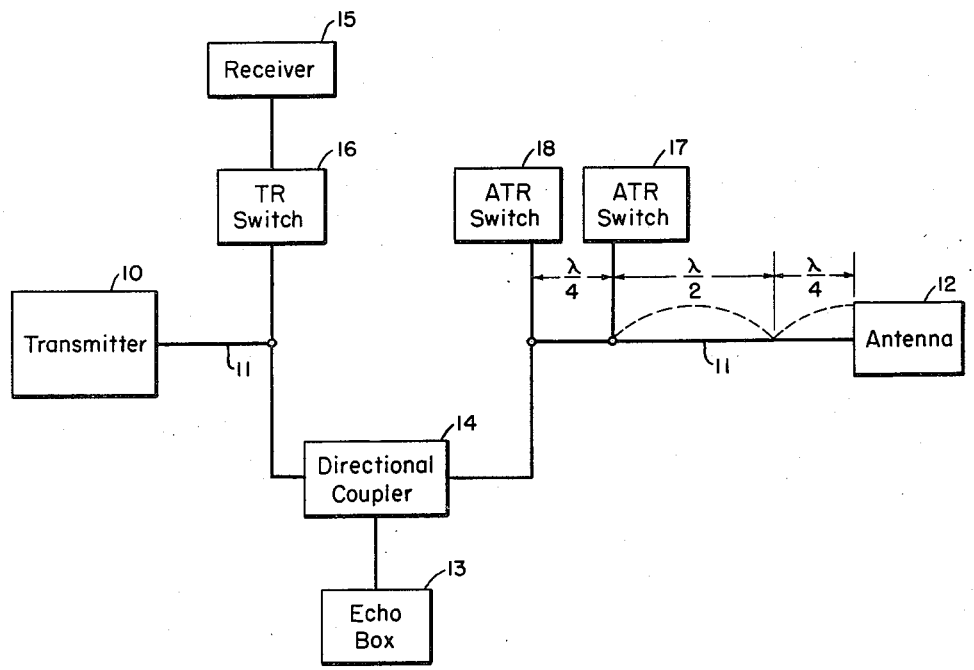
WITNESSES:
Robert C. Baird
Nw. C. Groome
INVENTOR
Hagan L. Jackson.
BY
F. E. Browder
ATTORNEY Patented Oct. 20, 1953

2,656,534

UNITED STATES PATENT OFFICE 2,656,534

TUNE-UP SYSTEM FOR RADAR

Hagan L. Jackson, Baltimore, Md., assignor to Westinghouse Electric Corporation, East Pittsburgh, Pa., a corporation of Pennsylvania Application January 14, 1950, Serial No. 138,554

10 Claims. (Cl. 343—17.7)

1

This invention relates to radar systems, and it relates more particularily to circuits and circuit components for testing radar systems.

In tuning a radar system under test it has been the practice to connect an echo box through a directional coupler to the transmission line between the TR switch connection to the receiver, and the antenna. During the transmitting cycles the TR switch breaks down and presents a short circuit across the receiver for preventing it from being damaged by the transmitted pulses. The echo box absorbs energy from the transmission line during the transmitting cycles, and supplies this energy to the receiver during the receiving cycles, the discharge through the TR switch ceasing at such times so that the short across the receiver is removed. The echo box thus provides echo signals enabling a radar system to be tested and tuned in the absence of a target.

When such a system is used at sea, it has been found that during certain adverse weather conditions, echo signals reflected from the sea have been so intense that they have completely blocked out the signals from the echo box. This invention overcomes this difficulty by providing one or more ATR switches connected to the transmission line between the directional coupler and the antenna of such a system. The ATR switches are resonant during the receiving cycles and provide shorts across the transmission line which prevent any echo signals from the sea from affecting the signals from the echo box.

An object of the invention is to prevent echo signals other than those from test apparatus from affecting the receiver of radar apparatus under test.

Another object of the invention is to test a radar system with an echo box and to prevent echo signals other than those from the echo box from affecting the receiver of the system.

The invention will now be described with reference to the drawing, the figure of which is a diagrammatic view of a radar system embodying this invention.

The conventional transmitter 10 which may be a magnetron oscillator, is connected by the conventional transmission line 11 to the conventional antenna 12. The transmission line may be an open-wire line, a co-axial line or a wave guide depending upon the frequency involved.

The conventional echo box 13 is connected through the conventional directional coupler 14 to the transmission line. The conventional receiver 15 is connected through the conventional TR switch 16 to the transmission line between its connections to the transmitter and directional coupler.

The system described so far in connection with the drawing is conventional. During the transmitting cycles the TR switch 16 is fired by the transmitted pulses and provides a short across

2 the receiver preventing it from being damaged. At the end of each transmitted cycle the discharge through the TR switch ceases so that its short across the receiver is removed placing the receiver in condition to receive echo signals.

During the transmitting cycles the echo box 13 absorbs energy from the transmission line, and at the ends of the transmitting cycles supplies this energy through the transmission line and TR switch to the receiver as signals which simulate echo signals from a target, enabling the system to be tested and tuned. The directional coupler 14 prevents the signals from the echo box from travelling along the transmission line towards the antenna.

For preventing spurious echo signals such as those reflected from the sea under certain weather conditions, from attentuating or blocking the echo signals from the echo box, this invention adds a conventional ATR switch 17 connected to the transmission line between the antenna and the echo box and spaced a multiple of a quarter wave length from the antenna. Another conventional ATR switch 18 may be connected to the transmission line between the ATR switch 17 and the echo box, and spaced a quarter wave length from the switch 17. The ATR switches 17 and 18 may be placed in parallel with the line 11 or they may be placed in series with the line 11. They present a low impedance to sea return if in parallel with the transmission line 11 and a high impedance to the sea return if in series with the line 11.

The ATR switches 17 and 18 may be conventional ones each employing a discharge tube shunted by a short on the other side of its connection to the transmission line, the discharge tubes being fired by the transmitted pulses and their discharges ceasing at the ends of the transmitted pulses.

In operation, the ATR switches 17 and 18 are resonant during the receiving cycles, the shorts beyond their discharge tubes being reflected to their connections to the transmission line and appearing there as zero impedance, thus providing shorts across the transmission line between the antenna and the echo box, which so attentuate echo signals from the antenna that the signals from the echo box to the receiver are not interfered with. This action of the ATR switches does not attentuate the signals from the echo box which is located between them and the receiver. During the transmitting cycles the ATR switches break down and do not load the transmission line.

While I have shown my invention in but one form, it will be obvious to those skilled in the art that it is not so limited, but is susceptible of various changes and modifications without departing from the spirit thereof.

I claim as my invention:

1. In a radar system including a pulse transmitter, the combination of an antenna; a transmission line between said transmitter and antenna; a receiver connected to said line; and apparatus for storing high frequency energy in the form of oscillations when said transmitter is operating and of emitting said energy in the form of oscillations after said transmitter ceases to transmit, connected to said line between said receiver and antenna; and means connected in said line between said apparatus and said antenna for forming a relatively low impedance across said line during receiving cycles, and forming a relatively high impedance across said line during transmitting cycles.

2. In a radar system including a pulse transmitter, the combination of an antenna, a receiver connected to said line, and apparatus connected to said line between said receiver and said antenna for storing high frequency energy in the form of oscillations when said transmitter is operating and of emitting said energy in the form of oscillations after said transmitter ceases to transmit, and means connected in said line between said apparatus and said antenna for forming a relatively low impedance across said line during receiving cycles, and forming a relatively high impedance across said line during transmitting cycles, said means responding to energy in said line during transmitting cycles for removing said low impedance from across said line.

3. In a radar system including a pulse transmitter, an antenna, a transmission line between said transmitter and antenna, a transmit receive switch connected to said line, a receiver connected to said transmit receive switch, and an echo box connected to said line between said switch and antenna, the combination of an anti-transmit receive switch connected to said line between said echo box and antenna for forming a relatively low impedance across said line during the receiving cycles.

4. The invention claimed in claim 3 in which a second anti-transmit receive switch is connected to said line between the first mentioned anti-transmit receive switch and the echo box and spaced a quarter wave length of the oscillations to be employed in said line as measured in said line from the first mentioned anti-transmit receive switch.

5. In a radar system including a pulse transmitter, an antenna, a transmission line between said transmitter and antenna, a receiver connected to said line, and an echo box connected to said line between said receiver and antenna, the combination of an anti-transmit receive switch connected to said line between said echo box and antenna for forming a relatively low impedance across said line during the receiving cycles, and a second anti-transmit receive switch connected to said line between said first mentioned switch and said echo box and spaced a quarter wave length of the oscillations to be employed in said line as measured in said line from said first mentioned switch.

6. In a radar system including a pulse transmitter, an antenna, a transmission line between said transmitter and antenna, a transmit receive switch connected to said line, a receiver connected to said switch, a directional coupler connected to said line between said switch and antenna, and an echo box connected to said coupler; the combination of an anti-transmit receive switch connected to said line between said coupler and antenna for forming a relatively low impedance across said line during receiving cycles.

7. The invention claimed in claim 6 in which a second anti-transmit receive switch is connected to said line between said first mentioned anti-transmit receive switch and said coupler, and spaced a quarter wave length of the oscillations to be employed in said line as measured in said line from said first mentioned anti-transmit receive switch.

8. In a radar system including a pulse transmitter and a receiver, the combination of a transmission line, an antenna connected to one end of said transmission line and a directional coupler connected to the other end of said transmission line, means connected to said line for receiving oscillations during one period of time of storing the energy of those oscillations and of emitting those oscillations during another interval of time, and an anti-transmit receive switch connected in said line between said antenna and said directional coupler so that said line will conduct high frequency electromagnetic oscillations of high power but will not conduct electromagnetic oscillations of low power.

9. In a radar system including a pulse transmitter and a receiver, the combination of a transmission line, an antenna connected to one end of said transmission line and a directional coupler connected to the other end of said transmission line, means connected to said line for receiving oscillations during one period of time of storing the energy of those oscillations and of emitting those oscillations during another interval of time, and an anti-transmit receive switch connected in said line between said antenna and said directional coupler so that said line will conduct high frequency electromagnetic oscillations of high power but will not conduct electromagnetic oscillations of low power, said anti-transmit receive switch being connected an odd number of quarter wave lengths of the oscillations to be employed in the line as measured in the line from said antenna.

10. In a radar system including a pulse transmitter and a receiver, the combination of a transmission line, means connected at one point on said line for storing electromagnetic oscillation energy during one period of time and of emitting this energy as oscillations during another period of time; an antenna connected to an end of said line; and a first anti-transmit receive switch and a second anti-transmit receive switch being connected to said line between the point where said means is connected and where said antenna is connected, said first anti-transmit receive switch being connected a quarter wave length for the oscillations to be employed in the line as measured in the line from where said second anti-transmit receive switch was connected.

HAGAN L. JACKSON.

References Cited in the file of this patent

UNITED STATES PATENTS

| Number | Name | Date |
|---|---|---|
| 2,412,315 | Brown | Dec. 10, 1946 |
| 2,420,211 | Tourshou | May 6, 1947 |
| 2,532,539 | Counter et al. | Dec. 5, 1950 |
| 2,549,131 | Rideout | Apr. 17, 1951 |

FOREIGN PATENTS

| Number | Country | Date |
|---|---|---|
| 599,625 | Great Britain | Mar. 17, 1948 |

OTHER REFERENCES

Proc. IRE, March 1947, page 311.